Nov. 9, 1943.   F. P. ZIERDEN   2,334,141
HOSE REEL
Filed March 26, 1942
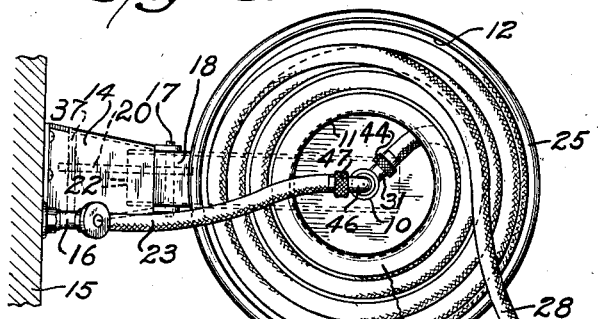
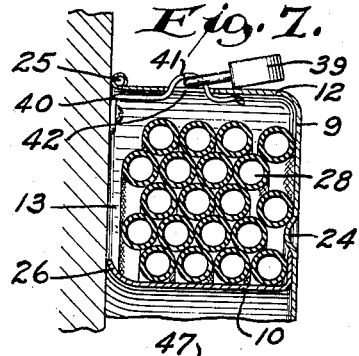
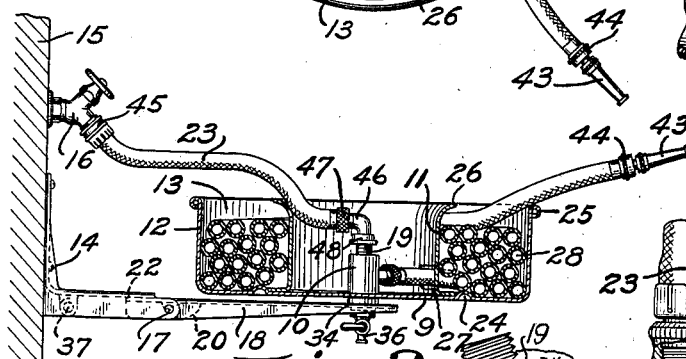
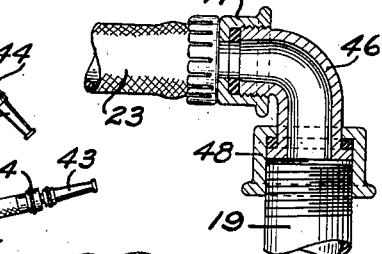
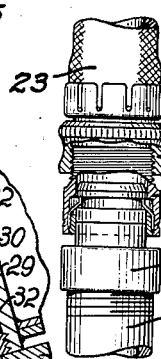
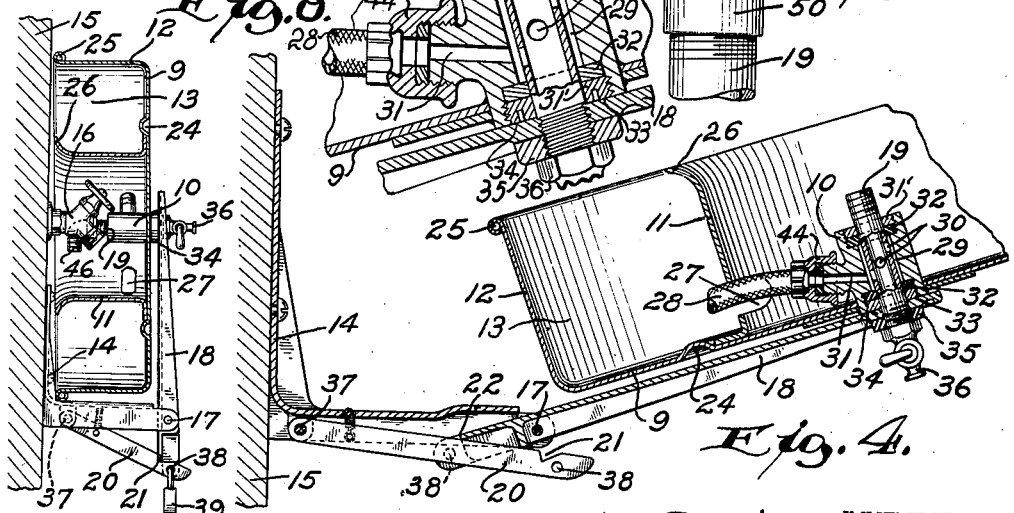
INVENTOR.
F. P. Zierden
BY Lieber & Lieber
ATTORNEYS.

Patented Nov. 9, 1943

2,334,141

UNITED STATES PATENT OFFICE 2,334,141

HOSE REEL

Frank P. Zierden, St. Francis, Wis.

Application March 26, 1942, Serial No. 436,325

16 Claims. (Cl. 299—77)

This invention relates generally to improvements in the art of protectively storing flexible elongated material such as rubber hose, and relates more particularly to improvements in the construction and operation of hose reels for garden hose or the like.

An object of the invention is to provide a new and useful hose coiling and housing assemblage which is simple, compact and durable in construction, and which is also highly efficient in operation.

Numerous styles of garden hose reels have heretofore been proposed and used with varying degrees of success, and in some of these prior structures provision has been made to protectively conceal the coiled hose when not in actual use. In my prior application Serial No. 383,675, filed March 17, 1941, I have disclosed an improved hose reel revolvable about a vertical axis and especially adapted to be rotatably suspended from the ceiling of a basement or other enclosure, the unit being provided with a tubular hose guide piercing a wall of the enclosure and co-operating with the reel basket so that the hose can be readily withdrawn but is normally housed within the basement; and while this type of hose reel is highly practical and successful, a basement or other enclosure must be available for its installation. In my prior application Serial No. 397,029, filed June 7, 1941, I have revealed a simple and very practical portable hose reel formed of sheet metal and having a basket provided with a cover which can be used as a pivotal support for the basket when the hose is being coiled into or is being withdrawn therefrom; and while the later improved reel unit conceals and protects the hose, it does not prevent theft of the entire assemblage since the basket is not permanently attached to fixed structure such as a building.

It is therefore a more specific object of my present invention to provide an improved hose reel unit which can be fixedly attached to a wall or the like near the water supply tap or faucet, and which is manipulable to effectively conceal and to prevent removal of the hose when not in use.

Another specific object of the present invention is to provide an improved hose reel assemblage comprising a simple basket of large capacity and of durable construction revolvable about an upright axis during coiling and removal of the hose, and in which the basket is caused to co-operate with its suspension wall in order to enclose and protect the hose when not being used.

A further specific object of this invention is to provide an extremely simple and readily manipulable garden hose reel which effectively guards against unauthorized tampering either with the water supply faucet or with hose when not in use, but in which the hose is quickly available when wanted and can also be readily drained without dislodging the same from the reel.

Still another specific object of the present invention is to provide an improved reel structure for hose or the like, which can be manufactured and sold at minimum cost, and which be conveniently installed and readily manipulated by a novice.

These and other specific objects and advantages of the invention will be apparent from the subsequent detailed description.

A clear conception of an embodiment of the present invention, and of the mode of constructing, installing and of manipulating the improved hose reel, may be had by referring to the drawing accompanying and forming a part of this specification wherein like reference characters designate the same or similar parts in the various views.

Fig. 1 is a top view of one of the improved hose reel units showing the basket lowered for normal use and the nozzle end of the hose partially withdrawn;

Fig. 2 is a central vertical section through the assemblage of Fig. 1, likewise showing the reel ready for use;

Fig. 3 is another central vertical section through the same reel unit, showing the basket coacting with its suspension wall to confine and conceal the hose coiled therein;

Fig. 4 is an enlarged fragmentary central vertical section through the same assemblage, showing the empty basket partially raised;

Fig. 5 is a further enlarged section through one type of swivel coupling for connecting the hollow central reel spindle with the water supply;

Fig. 6 is a similarly enlarged section showing a quickly detachable swivel connector for likewise connecting the reel with the water supply line;

Fig. 7 is a fragmentary section showing a modified method of locking the basket in inactive or hose confining position; and Fig. 8 is an enlarged fragmentary sectional view of the basket mounting associated with the swinging end of the supporting lever.

While I have shown my invention herein as being especially applicable to a reel for protecting and concealing an ordinary garden hose, it is not my desire or intent to unnecessarily restrict the scope or utility of the improvement by virtue of this specific embodiment.

Referring to the drawing, the improved garden hose reel unit shown therein comprises in general a circular sheet metal basket 9 having a hollow central hub 10 and an inner circular partition or wall 11 surrounding the hub 10 and co-operating with the outer basket wall 12 to provide an annular hose confining recess 13; an L-shaped supporting bracket 14 adapted to be fixedly secured to a wall 15 near a water supply tap or faucet 16, and having a horizontal transverse pivot pin 17 mounted thereon; a lever 18 swingably suspended from the pivot pin 17 and having a hollow spindle 19 rigidly secured to its swinging end and rotatably supporting the basket hub 10; a locking arm 20 pivotally suspended from the bracket 14 and having a notch 21 cooperable with the inner end 22 of the lever 18 to retain the basket 9 in upright hose confining position; and a short length of hose or tubular connection 23 for placing the faucet 16 in communication with the tubular spindle 19.

The hose receiving and confining basket 9 which is obviously adapted to be swung about the pivot pin 17 from horizontal open position as shown in Figs. 1 and 2, to hose concealing and confining approximately vertical position as in Fig. 3, is preferably formed of relatively light but durable sheet metal, and is re-enforced by a bottom ridge 24 and by a peripheral bead 25; and the inner wall 11 may also be formed of similar sheet metal and is preferably welded to the basket bottom near the ridge 24. The upper end of the circular wall 11 may also be provided with an outwardly directed flange 26 extending a short distance over the annular recess 13, and the lower portion of this wall 11 is provided with one or more openings 27 for permitting passage of the inlet end of a garden hose 28 therethrough.

The journal hub 10 of the hose basket 9 may be constructed as depicted in detail in Figs. 4 and 8, and this hub which rotates with the basket 9 about the fixed hollow spindle 19 has an inner annular chamber 29 which is constantly communicable with the interior of the spindle 19 through a series of holes 30, and which is communicable with the inlet end of the hose 28 through an outlet 31. The hub 10 has journal glands 31' above and below the chamber 29 which are screw-threaded into the hub ends and rather snugly but rotatably engage the spindle 19, and the interior of the hub is also provided with upper and lower gaskets or packings 32 which can be compressed by rotating the adjacent glands 31' with the aid of a spanner wrench; and the bottom of the hub 10 is rigidly attached as by welding to the bottom of the basket 9, and the lower gland 31' is provided with a bearing surface 33 which coacts with a thrust bearing surface 34 on the swinging end of the lever 18 near the spindle 19. The upper and lower ends of the spindle 19 are screw-threaded, and the lower threaded spindle end has direct screw-thread coaction with a threaded hole in the lever end and may be firmly attached to the lever 18 by means of a clamping or lock nut 35, and the spindle 19 is provided with a drain cock 36 for effecting drainage of water from within a hose 28 coiled within the basket 9 when the latter is disposed horizontally.

The bracket 14, lever 18 and latch arm 20 may also be formed of relatively heavy sheet metal with the aid of punches and dies, or of any other suitable material, and the L-shaped bracket may be firmly attached to the wall 15 in any convenient manner so that both the fastening means and the faucet 16 are totally concealed and inaccessible when the basket 9 is in vertical or closed position. The locking bar or arm 20 is swingably suspended from the bracket 14 closely adjacent to the wall 15, by means of a pivot bolt 37 and is constantly urged to swing toward the lever 18 by means of a tension spring, so that when the lever 18 is swung about its pivot pin 17 toward the wall 15, the lever end 22 will ride over the top of the latch arm 20 and will snap into the notch 21 whenever the basket 9 reaches approximately vertical position against the wall. The lever 18 must be of sturdy construction in order to properly support the basket 9 when loaded, and this lever may therefore be re-enforced by lower longitudinal and transverse ribs as shown.

While the basket supporting lever 18 will be held by gravity in approximately horizontal position and with its inner end 22 coacting with the under-side of the bracket 14, when the basket 9 is lowered to horizontal or open position, means should be provided for locking the basket in vertical or closed position. In Figs. 3 and 4, I have shown the lever 18 and latch arm 20 provided with holes 38 which are automatically brought into axial alinement whenever the lever end 22 engages the notch 21, and an ordinary pad-lock 39 may be applied to these holes 38 when alined so as to prevent release of the latch bar and lowering of the lever and basket. In Fig. 7, I have shown a modified locking assemblage consisting of a spring latch 40 secured to the wall and having a U-shaped swinging portion 41 adapted to snap through a slot 42 in the outer basket wall 12, and a pad-lock 39 coacting with the latch portion 41. While the type of locking arrangement shown in Fig. 3 is less visible, the modified type of Fig. 7 is probably more secure; but either type will prevent unauthorized access to the faucet 16 and to a hose 28 confined within the reel basket 9.

The flexible rubber garden hose 28 which is adapted to be confined within the reel basket 9, may be of any desired length and is provided at its outer free end with a spray or jet nozzle 43, while its inner end is provided with an ordinary hose coupling 44 adapted to be detachably connected to the hub outlet 31. The tap or faucet 16 which is associated with the wall 15, may be of any desired type; and the hose connection 23 which is adapted to place this faucet in communication with the interior of the hollow spindle 19, has a coupling 45 at one end for detachably connecting the hose length 23 with the faucet. The other end of the connection 23 is preferably provided with some form of swivel connection adapted to be removably attached to the upper screw threaded end of the spindle 19, and this connection may be either of the type shown in detail in Fig. 5, or that shown in Fig. 6. The swivel connection shown in Fig. 5 comprises an elbow 46 one end of which is screw threaded for detachable attachment to an ordinary hose coupling 47 at the outer end of the connection 23, and the opposite end of which carries a swivel coupling 48 adapted for detachable attachment to the upper end of the spindle 19. The modified swivel connection shown in Fig. 6 comprises a detachable slip coupling one part 49 of which is attachable to the coupling 47, and the other part 50 of which is internally screw threaded for attachment to the upper end of the spindle 19. Both of these swivel connections will obviously permit the flexible hose connection 23 to readily adjust itself to permit opening and closing and rotation of the reel basket 9 without kinking the connection 23.

When the improved hose reel unit has been properly constructed and assembled, it may be suspended from the wall 15 closely adjacent to the faucet 16 as illustrated in the drawing, whereupon the assemblage is constantly available for use. A hose 28 fifty feet in length may be applied to and comfortably stored within a basket 9 approximately twenty inches in diameter and six inches high, and the basket may be swung from closed position adjoining the wall 15 to open horizontal position, after the pad-lock 39 has been removed, by merely depressing the latch arm 20 with a foot and by thereafter lowering the basket 9 and lever 18. When the basket 9 has been thus lowered, the hose 28 may be withdrawn from the annular recess 13 by merely pulling on the nozzle end of the hose, and when the pulling force is interrupted the rotation of the basket 9 will cease. In order to return the hose 28 to the basket, it is only necessary to push the hose tangentially into the recess 13, thereby revolving the basket 9 and neatly coiling the hose therein as shown in Figs. 1 and 2. The hose laden basket 9 may be quickly returned to closed position as shown in Fig. 3, by merely swinging the basket 9 and the lever 18 about the pivot pin 17 until the basket 9 engages the wall 15, and the latch lever 20 becomes effective, whereupon the pad-lock 39 may be re-applied either as shown in Fig. 3 or as illustrated in Fig. 7. When the basket 9 is in upright or closed position, it simultaneously conceals the hose 28 and the faucet 16, and also covers the fastening means for the bracket 14, thereby effectively concealing and protecting the various parts against unauthorized tampering. If it is desired to drain the hose 28 before enclosing the same, this may be readily accomplished when the hose laden basket is in the position shown in Fig. 2, by merely opening the drain cock 36.

From the foregoing detailed description it will be apparent that the present invention provides an improved hose reel unit which is simple, compact and durable in construction, and which is moreover highly effective in use and adapted to thoroughly conceal and protect the hose. The improved assemblage can readily be installed on any available outer wall preferably near the water supply faucet 16, and protects the faucet as well as the hose, when not in use. The hose is however quickly available for use, and by providing a suitable pad-lock 39 the owner of the hose can prevent unauthorized access to the faucet and hose. The improved assemblage can obviously be manufactured, assembled, and installed at moderate cost and maintains the hose 28 in neatly coiled condition thereby prolonging the life of the hose to a maximum. The invention has proven highly satisfactory in actual use and the basket 9 is adapted to confine maximum lengths of hose within minimum available space.

It should be understood that it is not desired to limit this invention to the exact details of construction or to the precise mode of use, herein shown and described, for various modifications within the scope of the claims may occur to persons skilled in the art.

I claim:

1. In combination, a supporting bracket, a lever movably suspended from said bracket, a hose confining basket rotatably supported on the movable end of said lever, and plural means for effecting fixed disposition of said lever to either open or close said basket.

2. In combination, a supporting bracket adapted to be mounted upon a wall, a lever swingably suspended from said bracket, a hose confining basket rotatably journaled on the swinging end of said lever, and plural means for effecting disposition of said lever to either retain said basket in horizontal open position or in upright closed position sealed by said wall.

3. In combination, a supporting bracket adapted to be mounted upon a wall, a lever swingably suspended from said bracket, a hose confining basket rotatably journaled on the swinging end of said lever, plural means for effecting disposition of said lever to either retain said basket in horizontal open position or in upright closed position sealed by said wall, and means for locking said basket in said closed position.

4. In combination, a supporting bracket formed for fixed mounting upon a wall, a lever swingably suspended from said bracket, a hollow spindle secured to the swinging end of said lever, a hose confining basket journalled for rotation about said spindle, means for delivering liquid through said spindle to a hose extending into said basket, and plural means for effecting disposition of said lever to either retain said basket in horizontal position or in approximately vertical closed position sealed by said wall.

5. In combination, a supporting bracket formed for fixed mounting upon a wall, a lever swingably suspended from said bracket, a hollow spindle secured to the swinging end of said lever, a hose confining basket journalled for rotation about said spindle, means for delivering liquid through said spindle to a hose extending into said basket, plural means for effecting disposition of said lever to either retain said basket in horizontal position or in approximately vertical closed position sealed by said wall, and means for locking said basket in said closed position.

6. In combination, a supporting bracket adapted to be mounted upon a wall, a lever swingably suspended from said bracket, a hose confining basket rotatably journalled on the swinging end of said lever, and a latch arm carried by said bracket and coacting with said lever to retain said basket closed by said wall when the lever is swung into approximately upright position.

7. In combination, a bracket adapted to be mounted upon a wall, a lever pivotally suspended from said bracket and being swingable toward and away from the wall, and a hose confining basket rotatably journalled upon the swinging end of said bracket, said basket being disposed horizontal with its upper end open when said lever is in approximately horizontal position and being closed by said wall when the lever is swung upwardly.

8. In combination, a bracket adapted to be mounted upon a wall, a lever pivotally suspended from said bracket and being swingable toward and away from the wall, a hose confining basket rotatably journalled upon the swinging end of said bracket, said basket being disposed horizontal with its upper end open when said lever is in approximately horizontal position and being closed by said wall when the lever is swung upwardly, and means for locking said basket in said closed position.

9. In combination, a bracket adapted to be fixedly secured to a wall near a water supply faucet, a lever pivotally suspended from said bracket, a hollow spindle carried by the swinging end of said lever, a hose confining basket journalled for rotation upon said spindle, and means for conducting liquid from the faucet through said spindle to a hose having its inlet end extended into said basket, said lever being swingable toward the wall to cause the latter to close the basket and to conceal the faucet.

10. In combination, a bracket adapted to be fixedly secured to a wall near a water supply faucet, a lever pivotally suspended from said bracket, a hollow spindle carried by the swinging end of said lever, a hose confining basket journalled for rotation upon said spindle, means for conducting liquid from the faucet through said spindle to a hose having its inlet end extended into said basket, said lever being swingable toward the wall to cause the latter to close the basket and to conceal the faucet, and means for locking said basket in said closed position.

11. In combination, a lever suspended to swing toward and away from a wall having a water supply faucet associated therewith, a hose confining basket journalled on the swinging end of said lever, and means for conducting liquid from said faucet to a hose extending into said basket, said lever being swingable toward said wall to cause the latter to close the basket and to conceal the faucet.

12. In combination, a lever suspended to swing toward and away from a wall having a water supply faucet associated therewith, a hose confining basket journalled on the swinging end of said lever, means for conducting liquid from said faucet to a hose extending into said basket, said lever being swingable toward said wall to cause the latter to close the basket and to conceal the faucet, and means for locking said basket in said closed position.

13. In combination, a lever suspended to swing toward and away from a wall, a hollow spindle carried by the swinging end of said lever, a hose confining basket journalled on said spindle, and means for conducting liquid through said spindle to a hose extending into said basket, said lever being swingable toward said wall to cause the latter to close the basket and to conceal the hose disposed therein.

14. In combination, a lever suspended to swing toward and away from a wall, a hollow spindle carried by the swinging end of said lever, a hose confining basket journalled on said spindle, means for conducting liquid through said spindle to a hose extending into said basket, said lever being swingable toward said wall to cause the latter to close the basket and to conceal the hose disposed therein, and means for locking said basket in said closed position.

15. In combination, an element suspended to swing toward and away from an upright wall, a hose confining basket rotatably mounted on the swinging end of said element, and means for conducting liquid through said basket to a hose extending into the basket, said element being swingable toward said wall to cause the latter to close the basket and to conceal the hose therein.

16. In combination, an element suspended to swing toward and away from an upright wall, a hose confining basket rotatably mounted on the swinging end of said element, means for conducting liquid through said basket to a hose extending into the basket, said element being swingable toward said wall to cause the latter to close the basket and to conceal the hose therein, and means for locking said basket in said closed position.

FRANK P. ZIERDEN.